United States Patent
Baldi

(10) Patent No.: US 11,005,754 B1
(45) Date of Patent: May 11, 2021

(54) INCREMENTAL DEVELOPMENT OF A DATA PLANE PROGRAM

(71) Applicant: Cisco Technology, Inc., San Jose, CA (US)

(72) Inventor: Mario Baldi, Brooklyn, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 76 days.

(21) Appl. No.: 16/229,745

(22) Filed: Dec. 21, 2018

Related U.S. Application Data

(60) Provisional application No. 62/683,684, filed on Jun. 12, 2018.

(51) Int. Cl.
*H04L 12/771* (2013.01)
*H04L 29/06* (2006.01)

(52) U.S. Cl.
CPC ............. *H04L 45/56* (2013.01); *H04L 69/22* (2013.01)

(58) Field of Classification Search
CPC ..... H04L 45/56; H04L 69/22; H04L 47/2483; H04L 67/1008; H04L 12/46
See application file for complete search history.

(56) References Cited

U.S. PATENT DOCUMENTS

2017/0093723 A1* 3/2017 Sane ................... H04L 67/1008

FOREIGN PATENT DOCUMENTS

| CN | 107070766 A | 8/2017 |
| CN | 107070766 B | * 11/2019 |

OTHER PUBLICATIONS

David Hancock and Jacobus Van Der Merwe: "HyPer4: using P4 to Virtualize the Programmable Data Plane" Dec. 12-15, 2016, CoNEXT '16, pp. 2-8 (Year: 2016).*
Jeonkeun Lee, P4 Tutorial, hot Chips 2017 (Year: 2017).*
The P4 Language Consortium: "P4_16 Language Specification version 1.0.0" May 22, 2017 (Year: 2017).*
(Continued)

*Primary Examiner* — Phirin Sam
*Assistant Examiner* — Louis Samara
(74) *Attorney, Agent, or Firm* — Edell, Shapiro & Finnan, LLC

(57) ABSTRACT

In one example embodiment, a network management device obtains a definition of a first network packet header, an identification of a condition indicating that a network packet has the first network packet header, and a definition of processing action information that includes a key and a processing action to be taken on the network packet when metadata in the network packet matches the key. The network management device merges custom network packet processing instructions written in a data plane programming language with pre-existing network packet processing instructions written in the data plane programming language to produce merged network packet processing instructions written in the data plane programming language. The custom network packet processing instructions define the first network packet header, identify the condition, and define the processing action information. The network management device provides the merged network packet processing instructions for execution by a network node.

20 Claims, 14 Drawing Sheets

(56) References Cited

OTHER PUBLICATIONS

Stephen Ibanez, Gordon Brebner, robert Halstead, Chris Neely, tushar Swammy, sean Choi: "P4-NetFPGA, Hands-on Labs", P4_Day 2 2017 (Year: 2017).*
Mauro Ramos: Beyond OpenFlow Jul. 15, 2016 (Year: 2016).*
Perforce Command Reference, 2016, pp. 531 (Year: 2016).*
The P4 Language Consortium, "The P4 Language Specification", Verzion 1.0.4, May 24, 2017, 97 pages.
Pat Bosshart et al., "P4: Programming Protocol-Independent Packet Processors", ACM SIGCOMM Computer Communication Review, vol. 44, No. 3, Jul. 2014, 8 pages.

* cited by examiner

600

```
...
header_type ethernet_t {
    fields {
        dstAddr : 48;
        srcAddr : 48;
        etherType : 16;
    }
}
header ethernet_t ethernet;
...
header_type rtp_t {
    fields {
        version : 2;
        padding : 1;
        ...
        sequence_number : 16;
        timestamp : 32;
        SSRC : 32;
    }
}
header rtp_t rtp;
...
```

PRE-EXISTING CODE } (ethernet header block)
CUSTOM CODE } (rtp header block)

```
...
parser parse_ethernet {
    extract(ethernet);
    return select(latest.etherType) {
        ETHERTYPE_IPV4 : parse_ipv4;
        default: ingress;
    }
}
parser parse_udp {
    extract(udp);
    return parse_rtp;
}
...
parser parse_rtp {
    extract(rtp);
    return ingress;
}
...
```

PRE-EXISTING CODE } (parse_ethernet)
AUTOMATED CODE }
PRE-EXISTING CODE } (parse_udp start)
AUTOMATED CODE }
CUSTOM CODE } (parse_rtp)
AUTOMATED CODE }
PRE-EXISTING CODE }

1410 OBTAIN A DEFINITION OF A FIRST NETWORK PACKET HEADER, AN IDENTIFICATION OF A CONDITION INDICATING THAT A NETWORK PACKET HAS THE FIRST NETWORK PACKET HEADER, AND A DEFINITION OF PROCESSING ACTION INFORMATION THAT INCLUDES A KEY AND A PROCESSING ACTION TO BE TAKEN ON THE NETWORK PACKET WHEN METADATA IN THE NETWORK PACKET MATCHES THE KEY

1420 MERGE CUSTOM NETWORK PACKET PROCESSING INSTRUCTIONS WRITTEN IN A DATA PLANE PROGRAMMING LANGUAGE WITH PRE-EXISTING NETWORK PACKET PROCESSING INSTRUCTIONS WRITTEN IN THE DATA PLANE PROGRAMMING LANGUAGE TO PRODUCE MERGED NETWORK PACKET PROCESSING INSTRUCTIONS WRITTEN IN THE DATA PLANE PROGRAMMING LANGUAGE, WHEREIN THE CUSTOM NETWORK PACKET PROCESSING INSTRUCTIONS DEFINE THE FIRST NETWORK PACKET HEADER, IDENTIFY THE CONDITION, AND DEFINE THE PROCESSING ACTION INFORMATION

1440 PROVIDE THE MERGED NETWORK PACKET PROCESSING INSTRUCTIONS FOR EXECUTION BY A NETWORK NODE

FIG.14

INCREMENTAL DEVELOPMENT OF A DATA PLANE PROGRAM

CROSS REFERENCE TO RELATED APPLICATION

This application claims priority to U.S. Provisional Application No. 62/683,684, filed Jun. 12, 2018, the entirety of which is incorporated herein by reference.

TECHNICAL FIELD

The present disclosure relates to programming of a network data plane.

BACKGROUND

Programming Protocol-independent Packet Processors (P4) is a data plane programming language that is targeted at packet forwarding applications. Briefly, P4 allows a user to specify through software how a switch processes (e.g., forwards) packets. P4 is target-independent, meaning that it may be implemented an a variety of machines (e.g., Central Processing Units (CPUs), Field Programmable Gate Arrays (FPGAs), system(s)-on-chip, network processors, Application Specific Integrated Circuits (ASICs), software switches, etc.). Due in part to its protocol- and target-independent nature, P4 has experienced a notable growth in popularity in the networking industry over the last several years.

BRIEF DESCRIPTION OF THE DRAWINGS

FIG. 6 illustrates pre-existing network packet processing instructions merged with custom network packet processing instructions for a network packet header and a condition indicating that the network packet has the network packet header, according to an example embodiment.

FIG. 14 illustrates a flowchart of a method for incremental development of a data plane program, according to an example embodiment.

DESCRIPTION OF EXAMPLE EMBODIMENTS

Overview

In one example embodiment, a network management device obtains a definition of a first network packet header, an identification of a condition indicating that a network packet has the first network packet header, and a definition of processing action information that includes a key and a processing action to be taken on the network packet when metadata in the network packet matches the key. The network management device merges custom network packet processing instructions written in a data plane programming language with pre-existing network packet processing instructions written in the data plane programming language to produce merged network packet processing instructions written in the data plane programming language. The custom network packet processing instructions define the first network packet header, identify the condition, and define the processing action information. The network management device provides the merged network packet processing instructions for execution by a network node.

Example Embodiments

Figure 1:
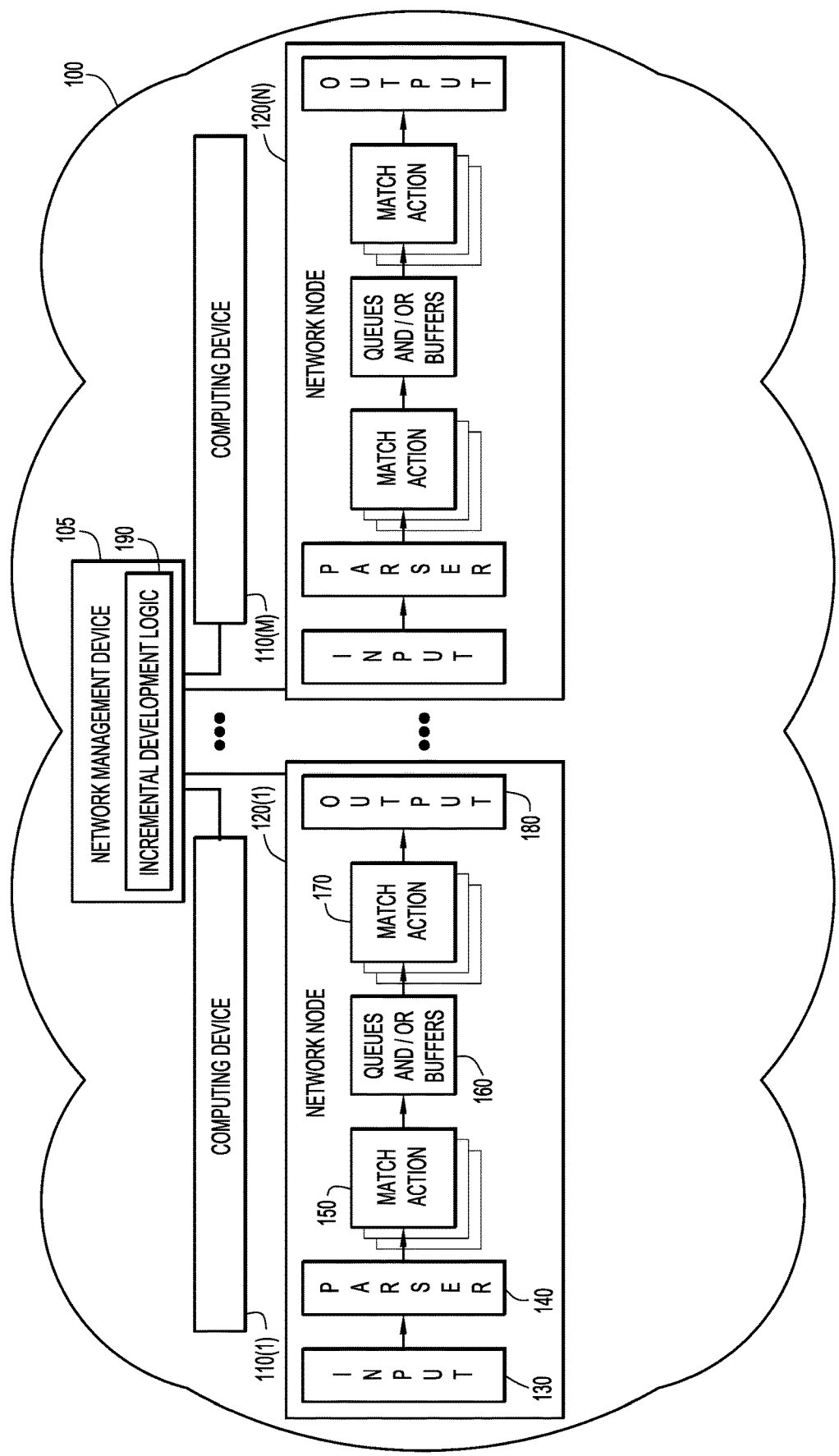
FIG. 1 illustrates a system for processing packets that can be programmed using an incrementally developed a data plane program, according to an example embodiment.

FIG. 1 illustrates a system 100 designed to support the execution of an incrementally developed data plane program (e.g., written in Programming Protocol-independent Packet Processors (P4)). System 100 may be a network which includes network management device 105 (e.g., a server, user device, etc.), a plurality of computing devices 110(1)-110(M) (e.g., servers, user devices, etc.) and a plurality of network nodes 120(1)-120(N) (e.g., switches, routers, gateways, firewalls, intrusion detection and prevention devices, etc.). Network management device 105 may be configured to communicate (directly or indirectly) with one or more of the plurality of computing devices 110(1)-110(M) and/or the plurality of network nodes 120(1)-120(N). The plurality of network nodes 120(1)-120(N) may be configured to facilitate transport of network packets to/from computing devices 110(1)-110(M). A user (e.g., network administrator) may interact with (e.g., modify/configure) the plurality of network nodes 120(1)-120(N) via network management device 105 (and/or one or more of the plurality of computing devices 110(1)-110(M)).

Each network node 120(1)-120(N) runs a data plane program such as a P4 program to process (e.g., forward) data packets. Network nodes 120(1)-120(N) may compile the P4 program into binary code used to instruct various components of the network nodes 120(1)-120(N). In another embodiment, the P4 program is compiled into binary code by one of the computing devices 110(1)-110(M). In one example, network nodes 120(1)-120(N) are Protocol-Independent Switch Architecture (PISA)-compliant devices.

Reference is made to functional aspects of network node 120(1) for simplicity, although it will be appreciated that network nodes 120(2)-120(N) may include similar functionalities. Network node 120(1) (e.g., an architecture of a programmable data plane chip of network node 120(1)) includes input 130, one or more programmable parsers 140, programmable match action units 150, queues/buffers 160, programmable match action units 170, and output 180. The P4 program may specify/define parsers 140, match action units 150, queues/buffers 160, and match action units 170.

At input 130, network node 120(1) obtains (receives) a network packet. The network packet may include a network packet header (e.g., a protocol header) that the data plane program extracts and stores as metadata. Network node 120(1) may determine that a condition indicating that the network packet has the network packet header is present in the network packet. In response, network node 120(1) causes parsers 140 to parse the network packet header for the metadata. Parsers 140 may extract the metadata from packets according to the network packet header descriptions and the specification of parsers 140 contained in the P4 program, and temporarily store the metadata in memory.

The condition/logic according to which a parser is invoked may be referred to herein as a "hook" or "hook point" (e.g., the hook point specifies how the parser is "hooked" onto a parser tree). The condition may be the network packet having a network packet header of a specified type or the network packet having a specific value or a range of values. For example, an Ethernet header parser may determine that the etherType field in an Ethernet header is set to the hexadecimal value 0800, which indicates that an Internet Protocol (IP) version 4 (IPv4) header is encapsulated inside the Ethernet header. In response, an IPv4 header parser may be executed. Here, the value in the etherType is a hook point for the IPv4 header parser.

Network node 120(1) also includes processing action information (e.g., a table) that includes a key and a processing action to be taken on the network packet when the metadata matches the key. Each table is searchable according to a key that is expressed as a combination of metadata elements. Each table is associated to a set of processing actions, one of which is executed when an entry (e.g., key) in the table matches the metadata. Table entries may be compiled by an external entity referred to as a "controller" or "control plane," with a value of the key to be matched and a reference to a processing action to be executed when the entry is matched. The table may also include action data (e.g., action parameters) to further define the processing action when executed. A table can also have a default action with default action data (e.g., parameter values) to be executed when the value of the metadata corresponding to the key extracted from the packet being processed does not match any entry.

After the metadata is extracted, match action units 150 determine whether the metadata matches one or more keys in one or more tables. More specifically, each match action unit 150 fetches the appropriate pieces of metadata from memory and uses the metadata to locate a matching entry in a table as specified by the P4 program. Once the entry is found, the corresponding action is retrieved and executed by an associated Arithmetic Logic Unit (ALU).

The P4 program may also include a control flow which specifies an order in which the tables are looked up when a network packet is processed, possibly responsive to conditions being met on the value of metadata or the results of table look-ups. Match action units 150 may execute look-ups in various tables in the order indicated by the control flow specified in the P4 program. If match action units 150 determine that the metadata matches the key(s), network node 120(1) executes the corresponding processing action(s) on the network packet in response.

After performing operations based on match action units 150, network node 120(1) may send the network packet to queues/buffers 160. Architecture specific metadata that can be modified by the actions may direct queues/buffers 160 in several ways (e.g., how to buffer packets, when to schedule the packets for transmission, through which output port to send the packets, etc.). Once the network packet reaches the top of the queue (for example), match action units 170 determine further actions to be taken (if any) based on whether the metadata extracted by parsers 140 matches any other keys. At output 180, network node 120(1) sends the network packet to another location.

As an example, network node 120(1) may extract metadata in the form of a destination address and a source address from an Ethernet header of a network packet. Match action units 150 may determine a particular action to be taken and associated action parameters based on the destination address matching a key. For instance, a first match action may involve looking up the destination address and based on the match assign to a piece of metadata the number of the port through which the packet should be forwarded; a second match action may involve looking up the source address and based on the match assign to a piece of metadata a value that indicates that the packet should be discarded; etc. Information in the network packet may be changed based on the results of the look-ups (e.g., network node 120(1) may re-write metadata in the network packet, create additional metadata, etc.).

Existing data plane programming languages such as P4 are not designed for modular or incremental programming. In other words, the language and the related software development tools assume that a program is being written by a single programmer or a team of programmers working together. In one common scenario, a vendor builds a switching/routing system based on a programmable switching chip that implements a programmable data plane (e.g., network nodes 120(1)-120(N)), and offers the system to their customers as a turn-key system with a pre-existing (vendor-supplied) data plane program and a network operating system.

In this scenario, the customers cannot add custom features to the data plane without extending the P4 program shipped with the system. However, the vendor might not want to give customers access to the pre-existing P4 program as it may contain confidential intellectual property. At the same time, customers themselves might not want to invest in understanding the vendor's (possibly complex) P4 program to make modifications that may amount to no more than a few lines of code. Also, customers might not want to ask the vendor to add their custom features on their behalf, as this could require the customer to provide to the vendor confidential information or trade secrets.

Accordingly, network management device 105 is provided with incremental development logic 190 to enable network management device 105 to perform operations described herein. Network management device 105 may proceed according to a custom portion of a data plane program added to a pre-existing portion of the data plane program via a data plane incremental development environment. As an example, incremental development logic 190 (and/or network node 120(1)) may enable a customer to cause the entries of the tables defined during incremental development to be compiled. Network node 120(1) may include corresponding logic for supporting the incrementally developed (e.g., custom) portion of the data plane program.

Briefly, incremental development logic 190 enables incremental development of a data plane program. This may allow a customer to add custom network packet processing instructions to pre-existing network packet processing instructions provided by a vendor. In one example, a development environment is provided to enable a customer to make certain changes to the pre-existing processing instructions by leading the customer through a series of steps. With these techniques, the customer is not required to inspect the pre-existing processing instructions, the operation of the pre-existing processing instructions and operating system are not compromised, and any sensitive information remains confidential. Based on the custom network packet processing instructions, a network node may execute one or more custom processing actions on a network packet obtained at that network node.

A procedure is described, and realized by the incremental development environment, for modifying a pre-existing data plane program to add custom functionalities or features in a way that existing functionalities, and the corresponding flow control, are not impacted. In order to achieve this, the customer is supported (and constrained) by a data plane incremental development environment that directs how the changes can be made to the pre-existing data plane program. For example, the Application Programming Interface (API) between the data plane and the control plane offered by the pre-existing data plane program and used to control the pre-existing features may not change with the custom (e.g., additional) features. That is, the pre-existing features may be controlled in the same manner before and after any custom features are added, which may ensure that the pre-existing control plane will continue working after the custom additions.

FIGS. 2-8 illustrate an example wherein a customer wants separate sets of servers to receive different chunks of a video stream. This requires routing packets differently after the video has played for a certain amount of time (e.g., modifying the IPv4 destination address). In this example, the customer-added data plane code needs to determine a pre-defined amount of time for which the video has streamed by looking up timestamps in network packets (e.g., in a Real-time Transport Protocol (RTP) header), which network nodes 120(1)-120(N) do not commonly do (i.e., the pre-existing data plane program does not cause network nodes 120(1)-120(N) to look up timestamps on network packets). Briefly, custom functionalities are added in this example by defining additional headers, specifying additional parsers, identifying suitable hooks in the existing parsers for the additional parsers, adding additional tables and actions, and defining how the new tables should be applied in terms of the order of application with respect to other tables (in both the pre-existing program and the customer-added program) and the conditions under which those tables should be applied.

Figure 2:
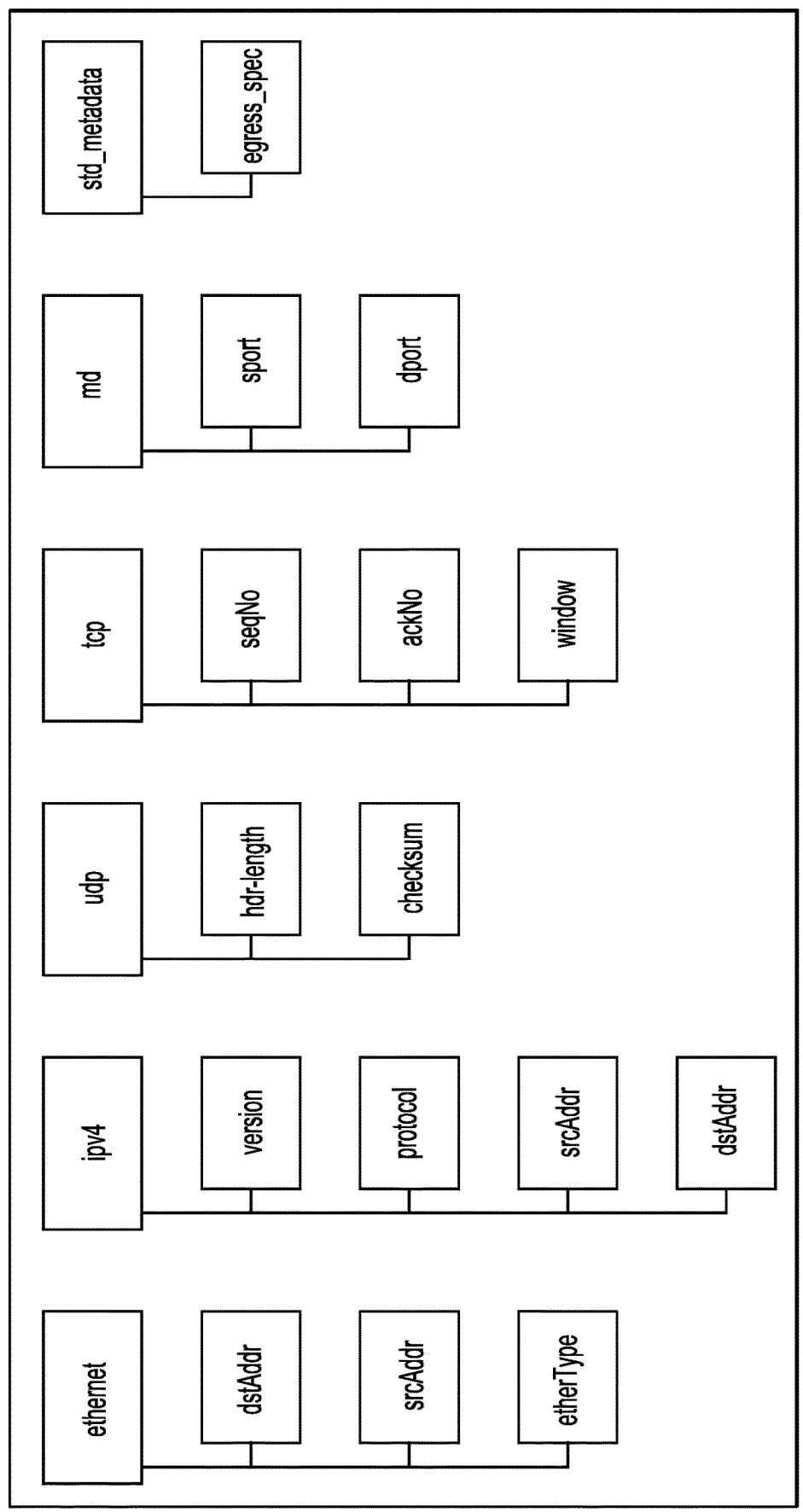
FIG. 2 illustrates a Graphical User Interface (GUI) of a data plane incremental development environment to enable a user to browse pre-defined keys in pre-existing network packet processing instructions, according to an example embodiment.

FIG. 2 illustrates an example Graphical User Interface (GUI) 200 (e.g., display screen) to enable the customer to browse pre-defined keys in pre-existing network packet processing instructions. GUI 200 may be executed on at least one of network managed device 105, computing devices 110(1)-110(M), or network nodes 120(1)-120(N). GUI 200 may be an indication of the pre-defined keys provided by network management device 105 based on an analysis of the pre-existing data plane program. For example, pre-defined keys may be names of fields that network node 120(1) may by default extract from the header of the packet according to the pre-existing (and possibly added) data plane program. One or more field shown in FIG. 2 may be pre-defined keys. The pre-defined keys are organized based on the type of header in which the corresponding metadata would be found in a network packet header. For example, destination address, source address, and etherType fields may be found in an Ethernet header; version, protocol, source address, and destination address fields may be found in an IPv4 header; etc.

GUI 200 provides the customer with select information automatically extracted from the preexisting data plane program in order to develop new functionalities without requiring access to (and consequently going through a lengthy code inspection of) the pre-existing data plane program. Specifically, one or more keys (including both header fields and metadata generated by the execution of the program) are extracted from the pre-existing program and presented to the customer. The vendor may restrict which keys are visible to the customer and/or modifiable by their code, and hence which keys are usable by the additional code that the programmer will write.

Figure 3:
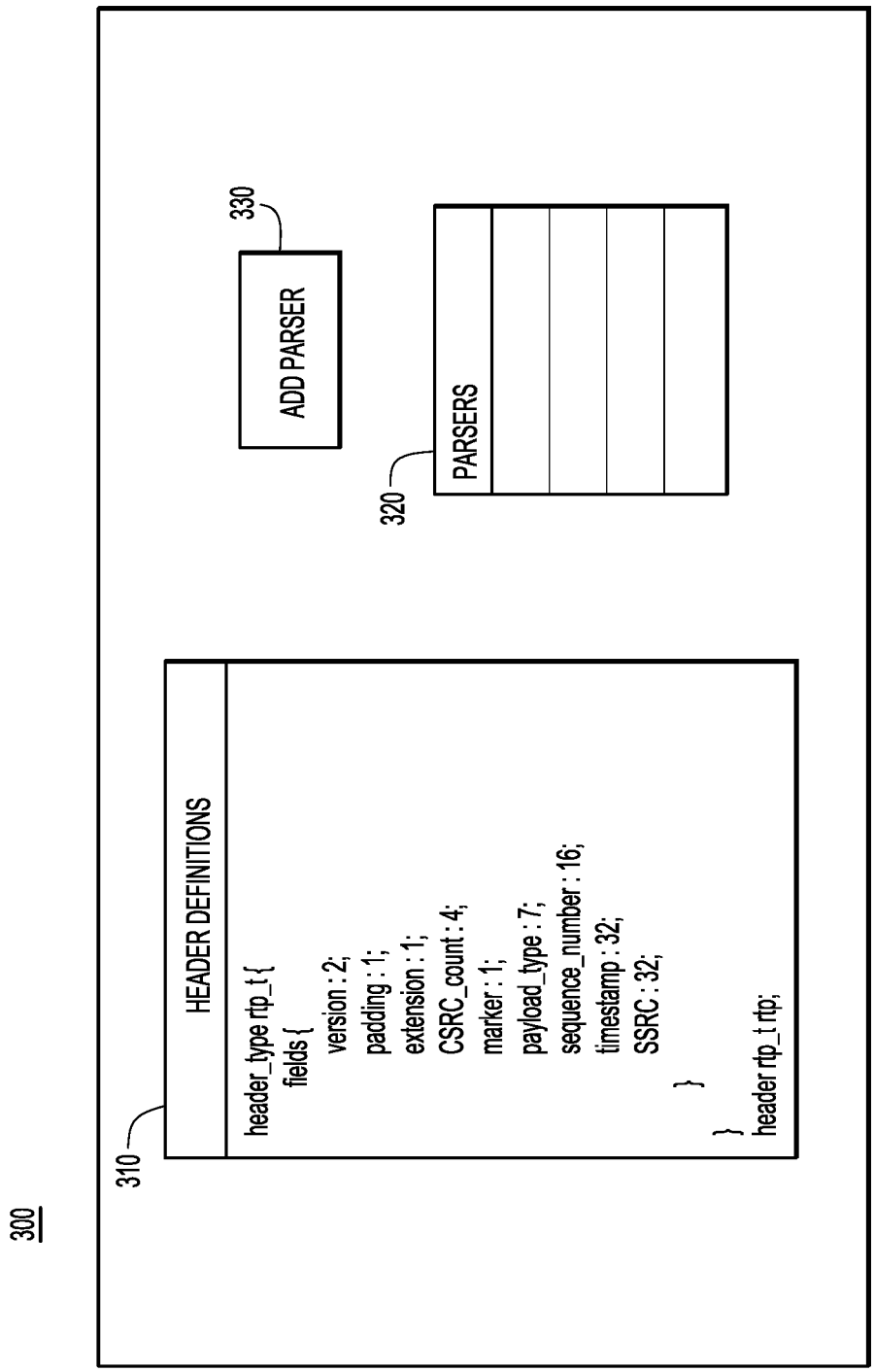
FIG. 3 illustrates a GUI to enable a user to define a network packet header, according to an example embodiment.

FIG. 3 illustrates an example GUI 300 (e.g., display screen) to enable the customer to define a network packet header. Network management device 105 may obtain a definition of the network packet header via GUI 300. GUI 300 includes a "Header Definitions" window 310, a "Parser" list 320, and an "Add Parser" button 330. Here, the customer defines a RTP header because it was not displayed in GUI 200 as a pre-defined network packet header processed by the pre-existing program. RTP headers include timestamps, which may enable the customer to determine when a video has streamed for a predefined time and the IPv4 destination address in subsequent network packets needs to be modified.

Under the "Header Definitions" window 310, the customer may define the name and length of the various fields in the RTP header in P4 (or any other data plane programming language). For example, the timestamp field is indicated as having 32 bits. In other implementations, the customer may provide a text file containing P4 code defining new network packet headers. The "Parser" list 320 indicates any custom parsers that have already been defined. In this example, no custom parsers have yet been defined, and as such none are provided in the "Parser" list 320. The "Add Parser" button 330 enables the customer to add a custom parser.

Incremental development logic 190 may automatically merge custom data plane programming code corresponding to the new header definitions with the pre-existing program, provided that the custom network packet header definitions are not conflicting with the pre-existing network packet header definitions defined in the pre-existing data plane program provided by the vendor. For example, the customer may be prohibited from redefining pre-existing network packet headers or adding/removing fields to/from pre-existing network packet headers. Conflict checking may be performed as the customer enters new header definitions, before merging the custom data plane programming code with the pre-existing data plane programming code, or before or during compilation of the merged data plane programming code. Code obtained by compiling data plane programming language instructions may also be merged. Network node 120(1) may execute merged data plane programming code (including both pre-existing data plane programming code and custom data plane programming code).

Figure 4:
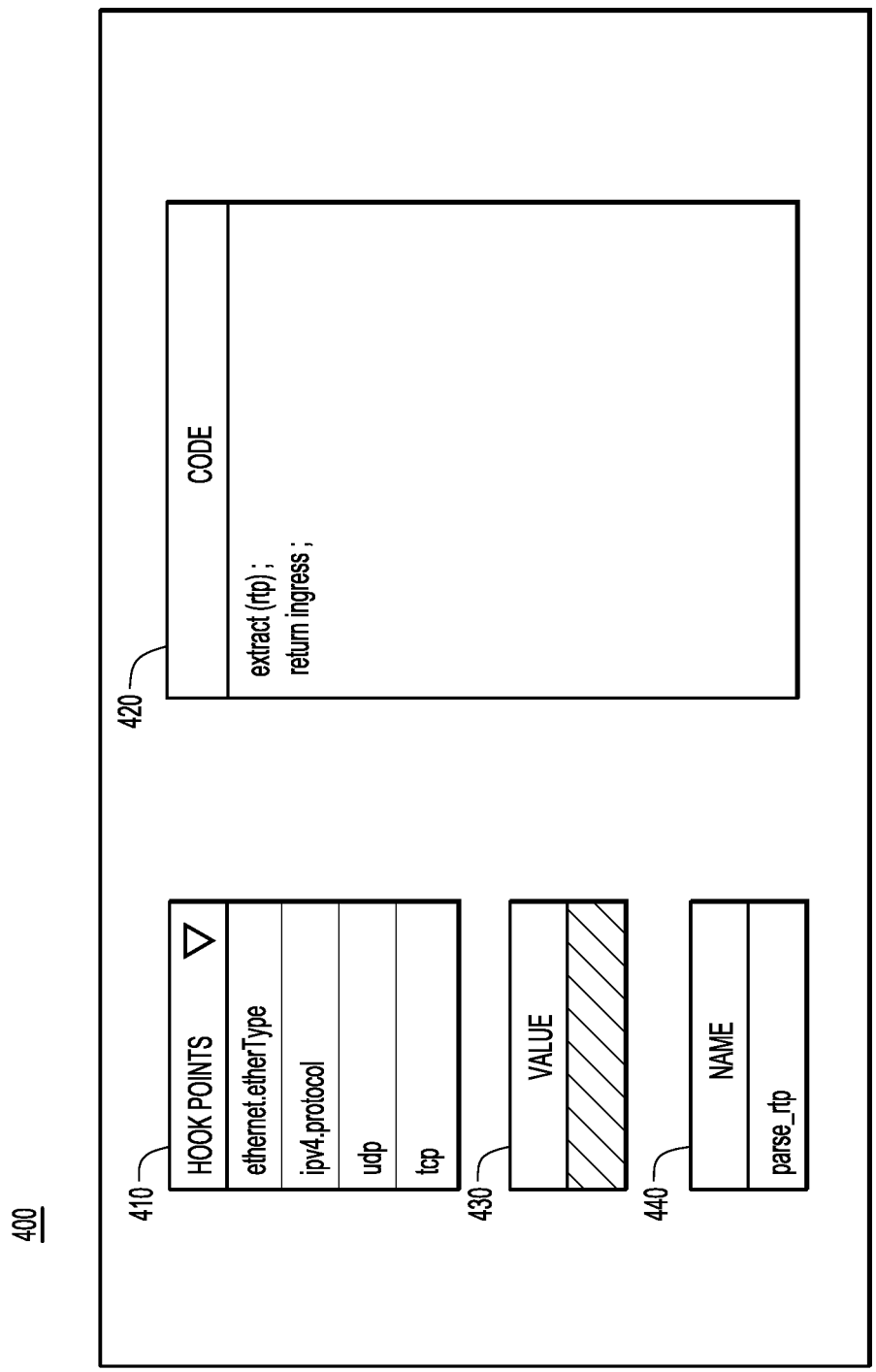
FIG. 4 illustrates a GUI to enable a user to identify a condition, within a pre-existing network packet processing program, indicating that a network packet has a newly defined network packet header, and to specify how to parse the newly defined packet header, according to an example embodiment.

FIG. 4 illustrates an example GUI 400 (e.g., display screen) to enable the customer to identify a condition within the pre-existing data plane program indicating that a network packet has the network packet header. Network management device 105 may obtain the identification of the condition via GUI 400. GUI 400 includes a "Hook Points" dropdown menu 410, a "Code" window 420, a "Value" field 430, and a "Name" field 440. The customer may reach GUI 400 by selecting (e.g., clicking) the "Add Parser" button in GUI 300.

The "Hook Points" dropdown menu 410 includes potential conditions in the form of network packet headers that, when present, would prompt the parsing of the newly defined RTP header. In another example, a potential condition is in the form of a specific field of a specific header having a specified value. The "Code" window 420 enables the customer to write data plane programming code to define a parser that specifies which header the parser extracts and how, assigns values to additional metadata, and calls other parsers, possibly conditionally to extracted data. The newly defined parser is executed according to logic based on information extracted by other parsers. In this example the parser of the RTP header is executed whenever a User Datagram Protocol (UDP) header is extracted, since RTP is typically encapsulated in UDP. The network packet header extraction or field value that prompts the execution of a parser is the hook, and may be derived from the pre-existing data plane program or from a custom parser. The programming environment may automatically extract all possible hook points from the pre-existing (and/or custom) data plane program, display the hook points to the customer, and permit the customer to select a hook point for the newly created parser.

Once the hook point is selected, if it is a field, the customer may specify the value of the field that triggers the execution of the parser in the "Value" field 430. If the hook point is a header, as is the case here, a value cannot be specified. Because the hook point is a header (UDP header) in this example, the "Value" field 430 may be grayed out. The "Name" field 440 enables the customer to provide a name for the parser. Here, the customer has named the parser "parse_rtp."

A custom parser may provide a hook point for a subsequently created parser. In that case, when the customer inputs the name of the subsequently created parser in the "Name" field 440, network management device 105 may automatically select the corresponding hook point (and optionally the corresponding value) as specified within the custom data plane programming code written for the custom parser. In a further example, upon creation of the custom parser, network management device 105 may process the data plane programming code and add the corresponding hook point to the "Hook Points" dropdown menu 410. In another implementation, given a protocol that is shown as a possible hook point (e.g., UDP), the customer may specify a field of that protocol as a hook point with a specific value, rather than using the entire protocol (e.g., UDP) as a hook for the new parser.

Figure 5:
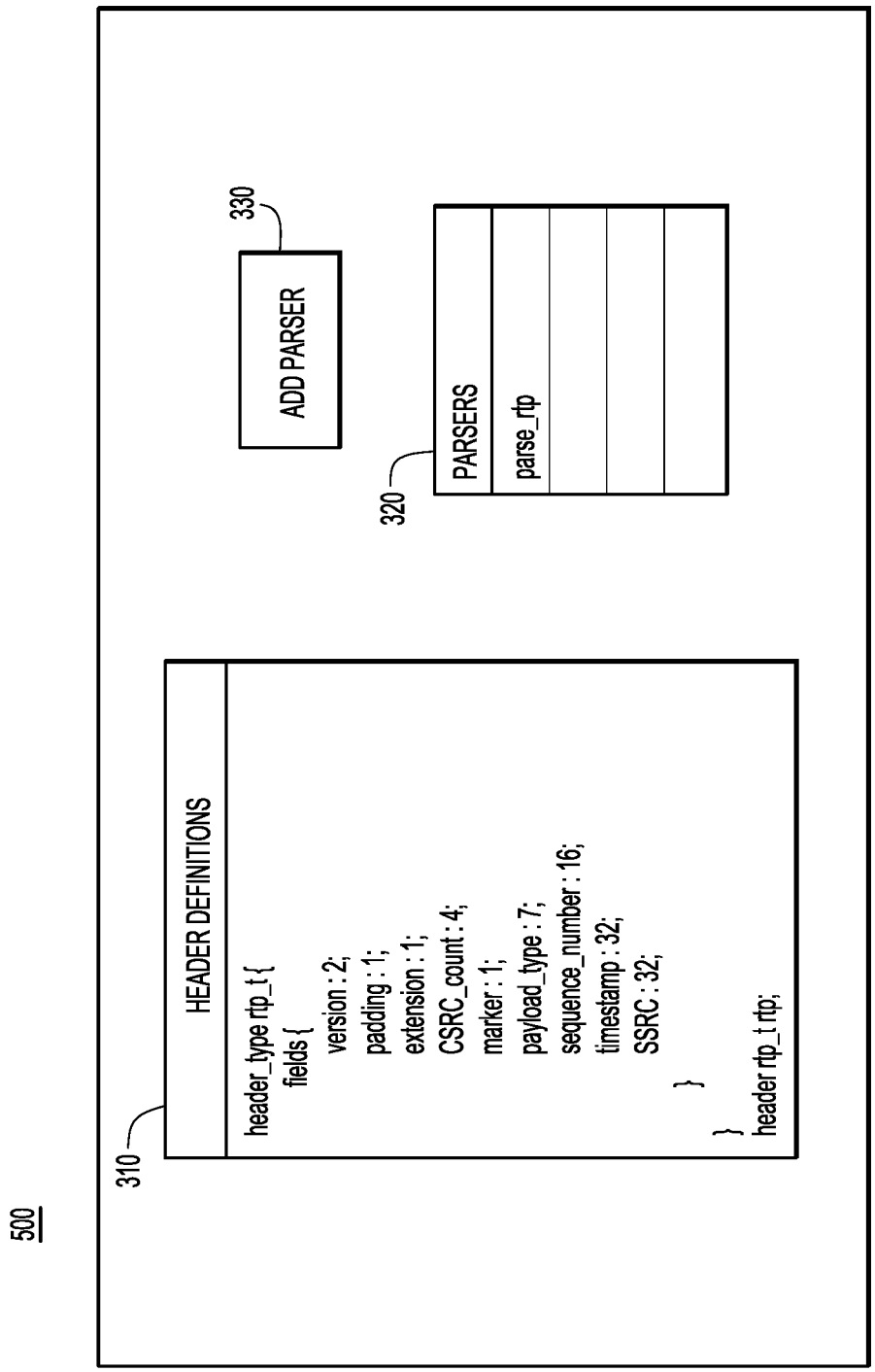
FIG. 5 illustrates a GUI to enable a user to review existing network packet header definitions and parsers, and define more network packet headers and parsers, according to an example embodiment.

FIG. 5 illustrates an example GUI 500 (e.g., display screen) to enable the customer to define more network packet headers and identify more hook points. GUI 500 is identical to GUI 300, but now parse_rtp has been added to the "Parsers" list 320. If desired, the customer may add more parsers in a similar manner (e.g., by defining other headers in the "Header Definitions" window 310).

FIG. 6 illustrates example merged network packet processing instructions 600. Merged network packet processing instructions 600 may include pre-existing network packet processing instructions, custom network packet processing instructions for the RTP parser and UDP header hook point, and automated code. Network management device 105 automatically adds the automated code as a result of the hook point (here, UDP header) chosen by the customer. Merged network packet processing instructions 600 may remain hidden from the programmer. Causing merged network packet processing instructions 600 to remain internal to network management device 105 avoids requiring the vendor to disclose potentially proprietary code and enables the customer to alter the pre-existing data plane programming code without examining the code directly.

Figure 7:
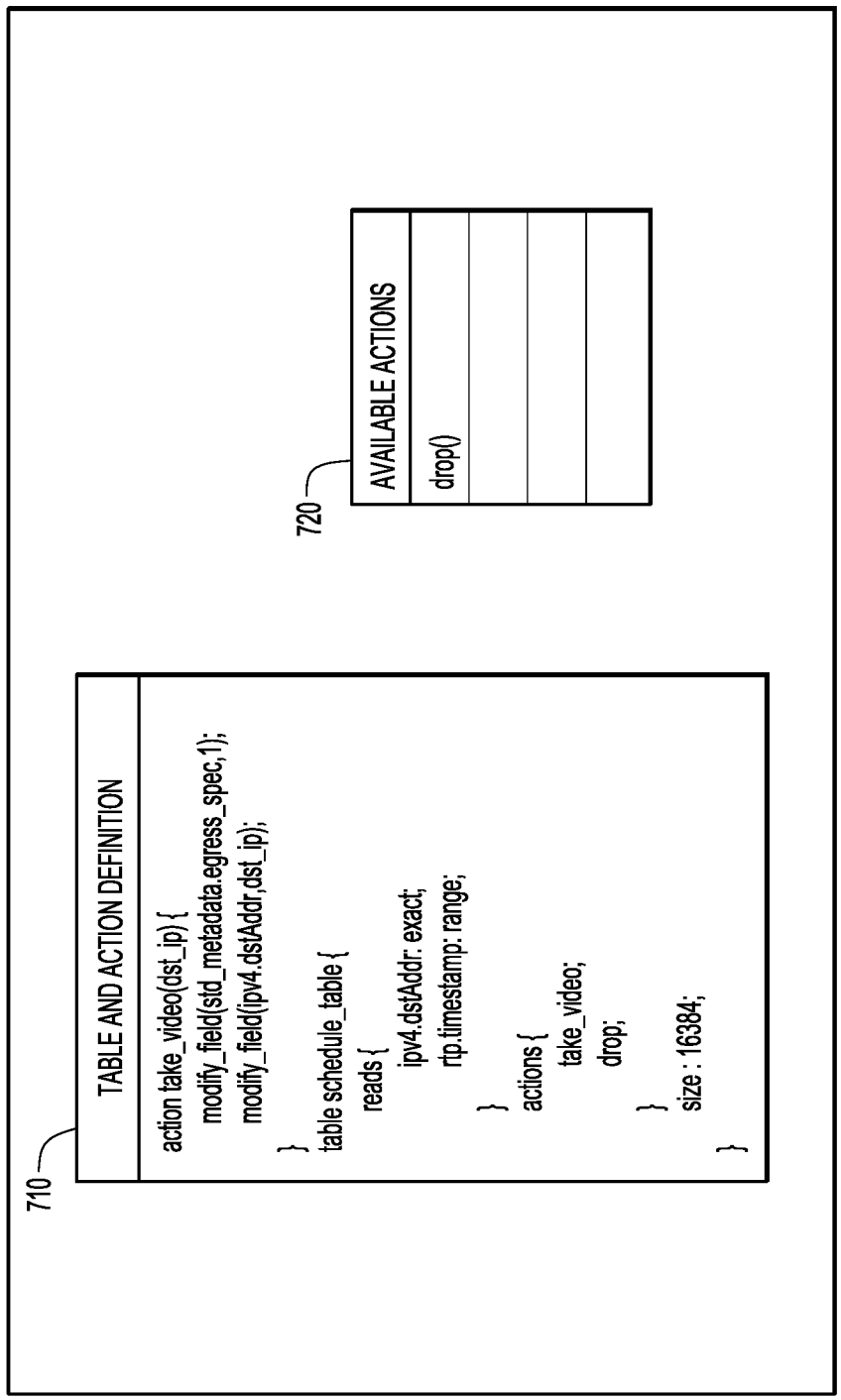
FIG. 7 illustrates a GUI that enables a user to define one or more tables including one or more key and one or more processing actions to be taken on a network packet when metadata in the network packet matches a given key, according to an example embodiment.

FIG. 7 illustrates an example GUI 700 (e.g., display screen) that enables a user to define a table including a key and a processing action to be taken on a network packet when metadata in the network packet matches the key. GUI 700 includes a "Table and Action Definition" window 710 and an "Available Actions" box 720. Network management device 105 may obtain a definition of processing action information (e.g., a table) that includes the key and the processing action via GUI 700. The customer may create tables and actions by writing data plane programming (e.g., P4) code in the "Table and Action Definition" window 710. Each entry in a table is associated with an action. In this example, "reads" corresponds to lookup keys and "actions" define the corresponding actions to be taken in the event of a match. The customer may create and modify custom tables, but may be prohibited from modifying pre-existing tables.

The "Available Actions" box 720 shows a list of available actions that the customer may specify as possible actions associated to a table entry (key) or invoke within the definition of new actions. This box also verifies that the P4 code written by the programmer in the "Table and Action Definition" window 710 is not modifying or substituting any existing tables and actions. That is, the "Available Actions" box 720 enforces the constraint that the customer can only add tables and actions to the pre-existing data plane code, but cannot modify the pre-existing data plane code.

In one possible implementation, a GUI leads the customer in the creation of tables and actions by displaying specific editable fields for specifying elements of tables and actions (e.g., name, parameters, keys, etc.). Network management device 105 may verify that each element is valid (e.g., that the customer is not trying to assign the same name to two different tables).

Figure 8:
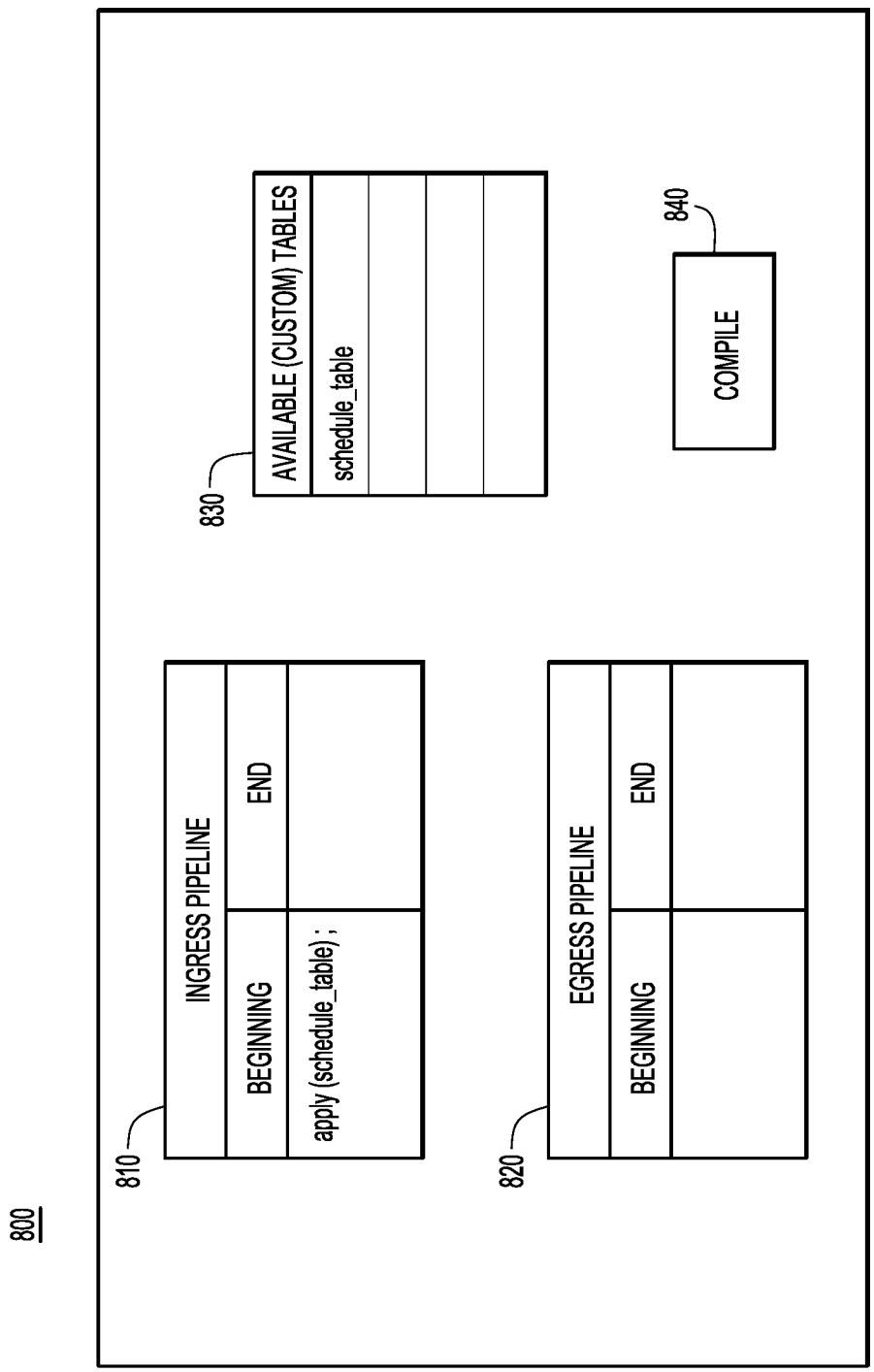
FIG. 8 illustrates a GUI that enables a user to specify when a table should be applied in a packet processing pipeline, according to an example embodiment.

FIG. 8 illustrates an example GUI 800 that enables a user to specify when a table should be applied in a packet processing pipeline. GUI 800 includes an "Ingress Pipeline" box 810, an "Egress Pipeline" box 820, an "Available (Custom) Tables" list 830, and a "Compile" button 840. The packet processing pipeline may include a series of pre-existing processing actions associated to a series of pre-existing tables. In particular, the "Ingress Pipeline" box 810 may include match action units 150 (FIG. 1), and the "Egress Pipeline" box 820 may include match action units 170 (FIG. 1). The "Available (Custom) Tables" list 830 provides an indication of all the available custom tables that the customer may cause to be inserted into the packet processing pipeline to be executed by match action units 150 (FIG. 1) and match action units 170 (FIG. 1).

As shown, GUI 800 provides free text fields for the customer to cause GUI 800 to insert the processing action (e.g., the application of a custom table) to be executed by match action units 150 before associated pre-existing action and table ("Beginning" column under the "Ingress Pipeline" box 810), to be executed by match action units 150 after associated pre-existing action and table ("End" column under the "Ingress Pipeline" box 810), to be executed by match action units 170 before associated pre-existing action and table ("Beginning" column under the "Egress Pipeline" box 820), or to be executed by match action units 170 after associated pre-existing action and table ("End" column under the "Egress Pipeline" box 820). The customer may specify the order and logic of the application of custom tables using, for example, P4 syntax. In this example, network node 120(1) may perform the processing action associated with the custom table "schedule table" using match action units 150 before associated pre-existing actions and tables.

The "Compile" button 840 may cause network management device 105 to merge custom network packet processing instructions written in a data plane programming language (e.g., P4) with pre-existing network packet processing instructions written in the same data plane programming language (e.g., P4). The custom network packet processing instructions may define the custom network packet headers, identify custom hook points, and define custom processing actions and corresponding data. In one example, before merging the respective network packet processing instructions, network management device 105 may determine whether the custom processing action information is a modification of pre-existing processing actions defined in the pre-existing network packet processing instructions. If not, network management device 105 may automatically generate automated network packet processing instructions to facilitate merging of the custom network packet processing instructions with the pre-existing network packet processing instructions.

In the example of FIG. 8, network management device 105 may merge custom network packet processing instructions with the pre-existing network packet processing instructions such that network node 120(1) looks up a key in a table and executes a processing action associated with that key (e.g., by match action units 150 or 170) before or after the series of pre-existing processing actions. This is because inserting the custom table between two particular pre-existing processing actions executed by match action units 150 or 170 may disrupt the flow and the outcome of the execution of pre-existing processing actions. For instance, the pre-existing processing actions may need to be carried out in a specific sequence, and changing the specific sequence by inserting a custom table may prevent the subsequent pre-existing processing actions from being accurately carried out. However, in a more sophisticated example, the customer may be permitted to insert custom actions into specific positions within a series of pre-existing processing actions, although this may require further visibility into the pre-existing processing actions. For example, network management device 105 may automatically identify possible insertion points, present the insertion points to the customer, and allow the customer to select one or more of the insertion points for given tables or portions of flow control. Network management device 105 may also enforce constraints to ensure that the pre-existing logic for table applications is not disrupted.

In one possible implementation, the vendor may specify possible insertion points (e.g., in the form of comments or ad hoc directives within the pre-existing data plane processing instructions) within pre-existing processing actions (e.g., pre-existing table applications) that network management device 105 may present to the customer. In another possible implementation, network management device 105 may provide a representation of the pre-existing data plane control flow and enable the vendor to specify insertion points. In yet another possible implementation, network management device 105 may automatically identify potential insertion points by statically or dynamically analyzing the pre-existing data plane processing instructions to determine logical blocks of processing instructions (e.g., code that has a common purpose, belongs together, whose flow control cannot be separated by potentially inserted custom control flow code, etc.). When the insertion points are presented to the customer, they may be complemented by a description of the purpose of the data plane processing instructions preceding and/or following the insertion point, or an indication of the effect of executing such data plane processing instructions.

Figure 9:
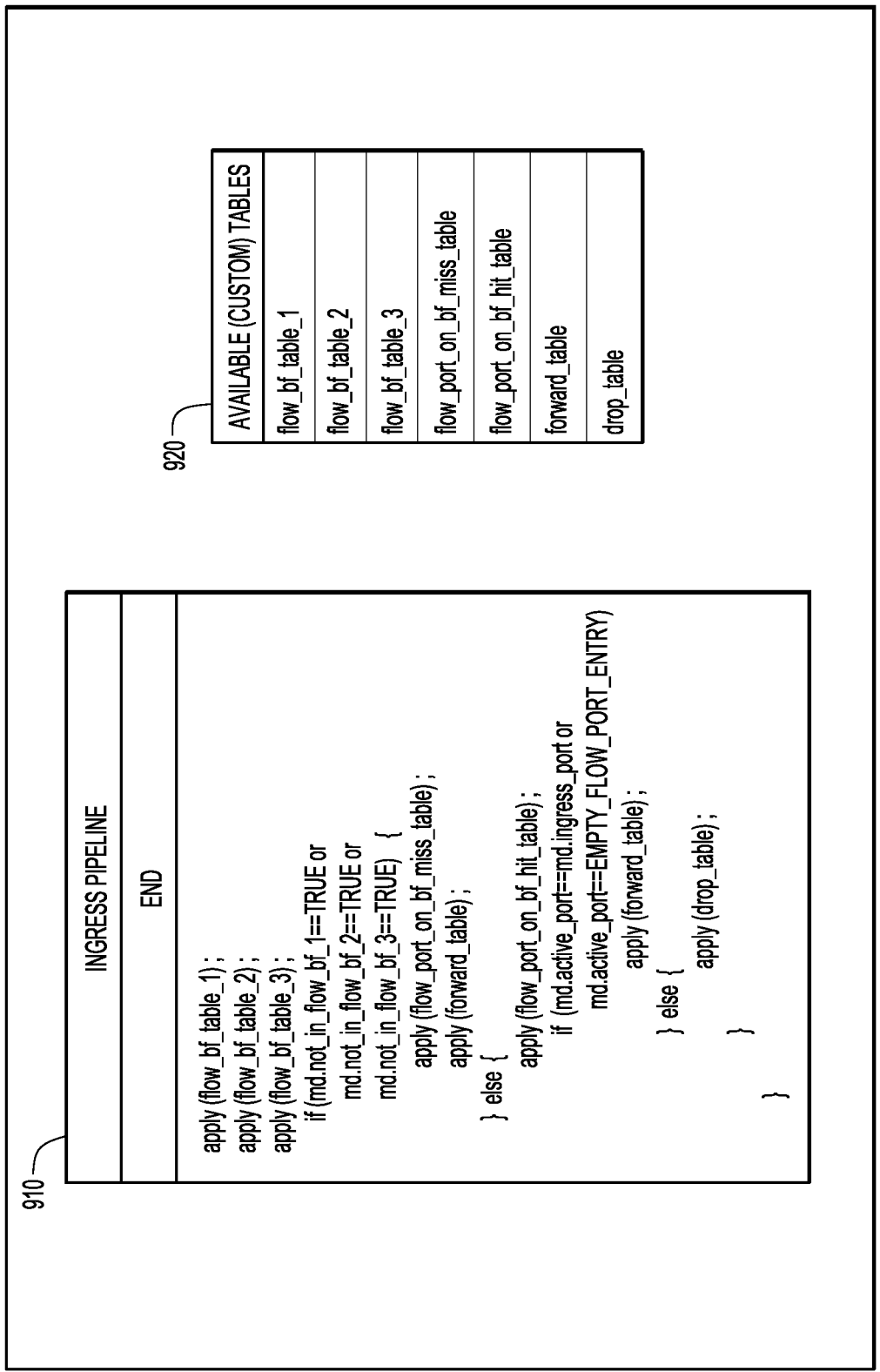
FIG. 9 illustrates a GUI that enables a user to specify when a plurality of tables should be applied in a packet processing pipeline responsive to conditions resulting from actions taken as a result of previous table applications, according to an example embodiment.

FIG. 9 illustrates an example GUI 900 that enables the customer to specify when a plurality of tables should be applied in a packet processing pipeline. GUI 900 is similar to GUI 800 and includes an "Ingress Pipeline—End" box 910 and "Available (Custom) Tables" list 920. In this example, there are a plurality of available custom tables shown in "Available (Custom) Tables" list 920, which are applied after match action units 150. Here, the customer specifies a more complex logic for the application of the plurality of tables. For instance, the customer may choose the order of the custom tables. It will be appreciated that multiple custom tables may be applied in multiple positions in a pipeline. In other words, multiple custom table need not be applied in the same spot (e.g., all at the beginning, the end, or an intermediate spot presented to the customer).

Figure 10:
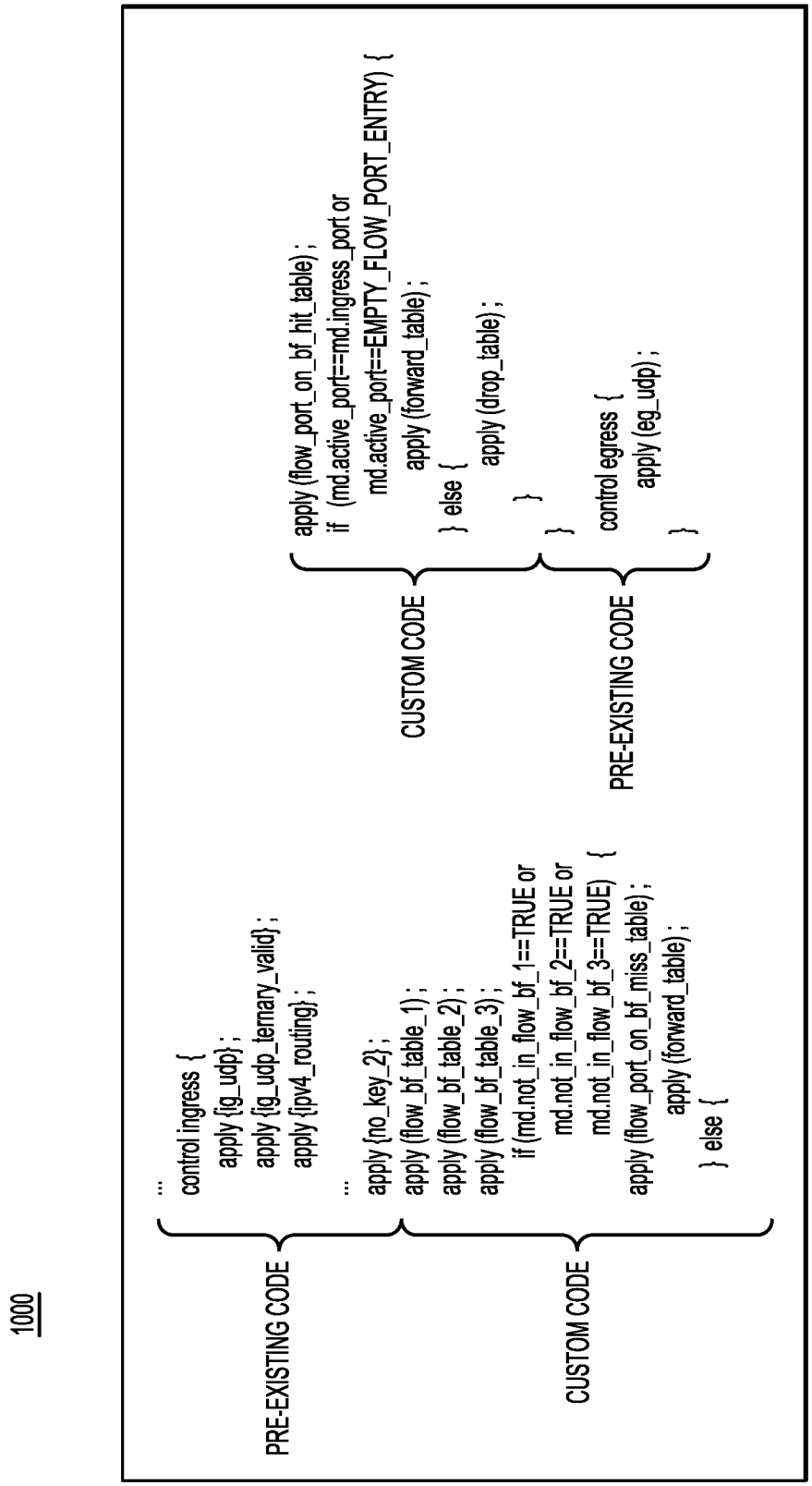
FIG. 10 illustrates pre-existing network packet processing instructions merged with custom network packet processing instructions for a packet processing pipeline, according to an example embodiment.

FIG. 10 illustrates example merged network packet processing instructions 1000. Merged network packet processing instructions 1000 may include pre-existing network packet processing instructions merged with custom network packet processing instructions for a packet processing pipeline corresponding to the example of FIG. 9. Network management device 105 may merge the respective network packet processing instructions after the customer selects a "Compile" option. Although in this example the merging of the custom network packet processing instructions and the pre-existing network packet processing instructions is performed at the source code level, in another example the merging may take place at the level of an intermediate representation produced by compiling the custom network packet processing instructions and the pre-existing network packet processing instructions.

Figure 11:
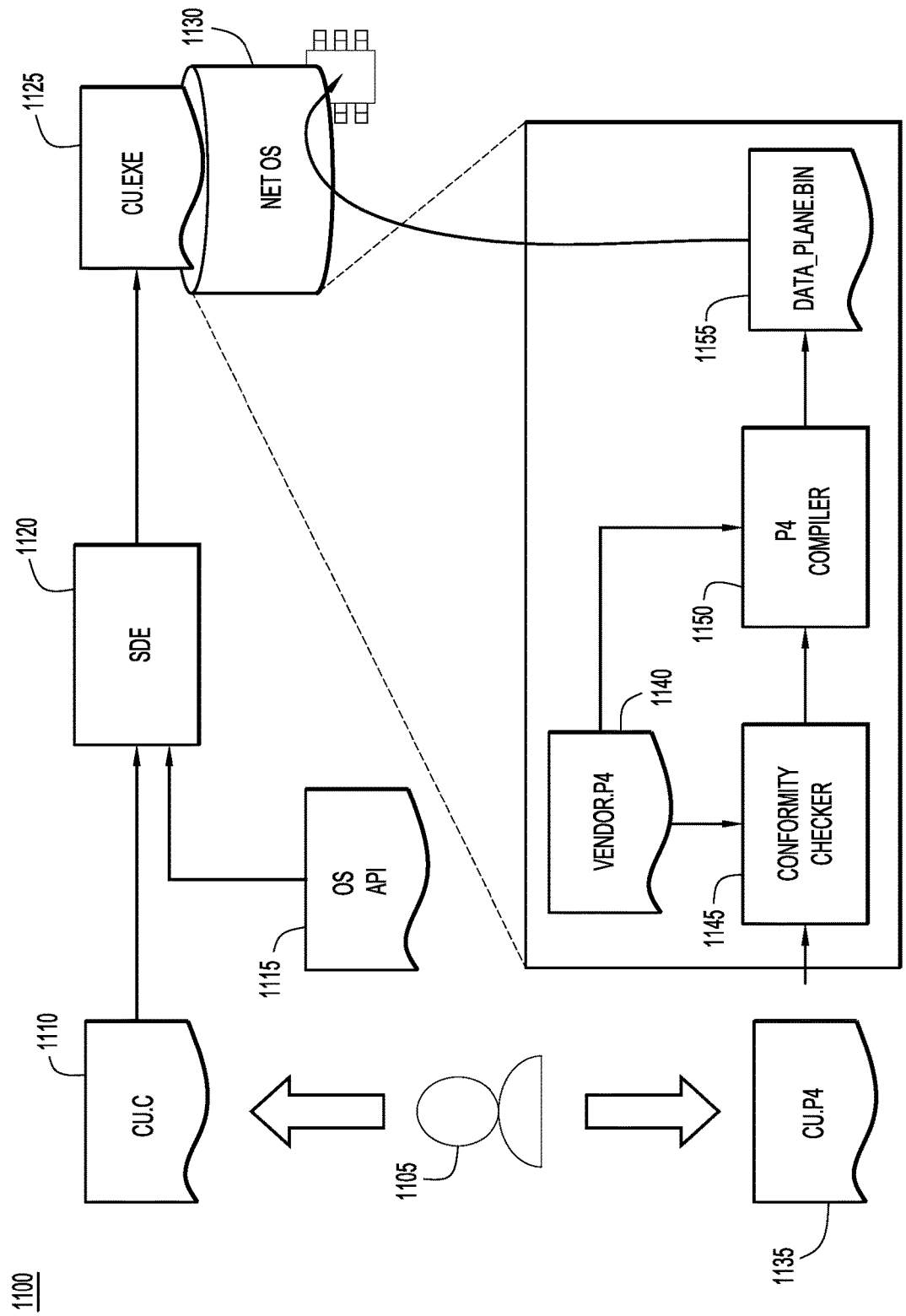
FIG. 11 illustrates a functional flow diagram depicting incremental development of a data plane program, according to an example embodiment.

FIG. 11 illustrates a functional flow diagram 1100 depicting incremental development of a data plane program. Functional flow diagram 1100 includes customer 1105, customer control plane source processing instructions (Cu.c) 1110, Operating System (OS) Application Programming Interface (API) 1115 Software Development Environment (SDE) 1120, customer control plane executable processing instructions (Cu.exe) 1125, NetOS 1130, and customer data plane processing instructions (Cu.p4) 1135. NetOS 1130 may be stored on a programmable data plane chip (e.g., a programmable data plane chip of network node 120(1)), and may include pre-existing data plane processing instructions (Vendor.p4) 1140, conformity checker 1145, P4 compiler 1150, and merged data plane processing instructions (Data-plane.bin) 1155. Cu.exe 1125 may run directly on top of NetOS 1130.

In this example, the customer provides both Cu.p4 1135 and Cu.c 1110. Cu.p4 1135 is fed to conformity checker 1145, which ensures that there is no conflict between Cu.p4 1135 and Vendor.p4 1140 (e.g., that Cu.p4 1135 is not attempting to change any pre-existing tables in Vendor.p4 1140). If there is no conflict, P4 compiler 1150 merges Cu.p4 1135 with Vendor.p4 1140 to produce Data_plane.bin 1155. Cu.c 1110 and OS API 1115 together comprise SDE 1120, which generates Cu.exe 1125. This configuration enables network node 120(1) to execute on NetOS 1130 and interact with Cu.p4 1110 in a controlled way such that Cu.exe 1125 is permitted to change content of tables defined in Cu.p4 1135 but not change the tables defined in Vendor.p4 1140. In particular, Cu.c 1110 interacts with Data_plane.bin 1155 using corresponding sub-APIs (e.g., OS API 1115). This enables network node 120(1) to use the custom data plane functionalities provided by Cu.p4 1135 by executing Cu.exe 1125 in order to implement corresponding control plane functionalities.

Cu.p4 1135 may define the custom tables to be applied and which actions are to be taken as a result, but key values, actions, and action parameters for each table entry may be provided (and/or removed) by Cu.exe 1125 as defined by Cu.c 1110. The control plane functionality may run on a general purpose processor that can communicate with the programmable data plane chip. In one example architecture, the general purpose processor and the programmable data plane chip are directly connected in the same system, for example through a Peripheral Component Interconnect (PCI) bus or a dedicated Ethernet channel. A driver executing on the general purpose processor enables communication with the programmable data plane chip. NetOS 1130 may run on the general purpose processor and control the programmable data plane chip, including tracking status and providing information (e.g., information to fill out each entry of the match action tables being used in the data plane). The aforementioned driver may a driver of NetOS 1130.

In another example architecture (e.g., in the Software Defined Networking (SDN) paradigm), the general purpose processor executing the control plane functionality may not be co-located with the programmable data plane chip, and instead interact with the programmable data plane chip through a network (e.g., IP or Ethernet network). Moreover, the same control plane software may be responsible for controlling multiple programmable data plane chips.

Regardless of the particular architecture being used, the control plane may be able to read, write, and delete entries in the tables, as well as perform any other table maintenance operations. Higher level functionalities used to perform these operations may be provided by an API to the data plane. The objects of those operations (keys, actions, parameters) depend on the specific P4 code used to program the programmable data plane chip. Hence, when P4 compiler 1150 compiles Data_plane.bin 1155, one or more corresponding APIs may be updated.

For each P4 program (e.g., Data_plane.bin 1155) there exists a different API. That API may be modeled, at a general level, as a collection of sub-APIs each controlling a different element (e.g., table) defined in the P4 program. In one possible solution, this API includes different functions to access different tables, in which case P4 compiler 1150 generates a library of functions to access the tables defined in Cu.p4 1135 and/or Vendor.p4 1140. In another possible solution, the API includes basic data transfer functionalities whose parameters specify the tables and objects involved. In this case, P4 compiler 1150 generates a configuration file for the API. Regardless of the particular design, adding Cu.p4 1135 as described herein may not change the sub-APIs related to Vendor.p4 1140. As a result, the control plane (e.g., running on NetOS 1130 or on a remote controller) that operates on the chip with the pre-existing processing instructions may remain functional (e.g., unchanged) with respect to the tables defined in the pre-existing processing instructions even after Cu.p4 1135 is added and the binary code resulting from merging Vendor.p4 1140 and Cu.p4 1135 (e.g., Dataplane.bin 1155) is uploaded to the data plane chip. A new set of sub-APIs may be generated to control the elements defined in Cu.P4 1135.

Figure 12:
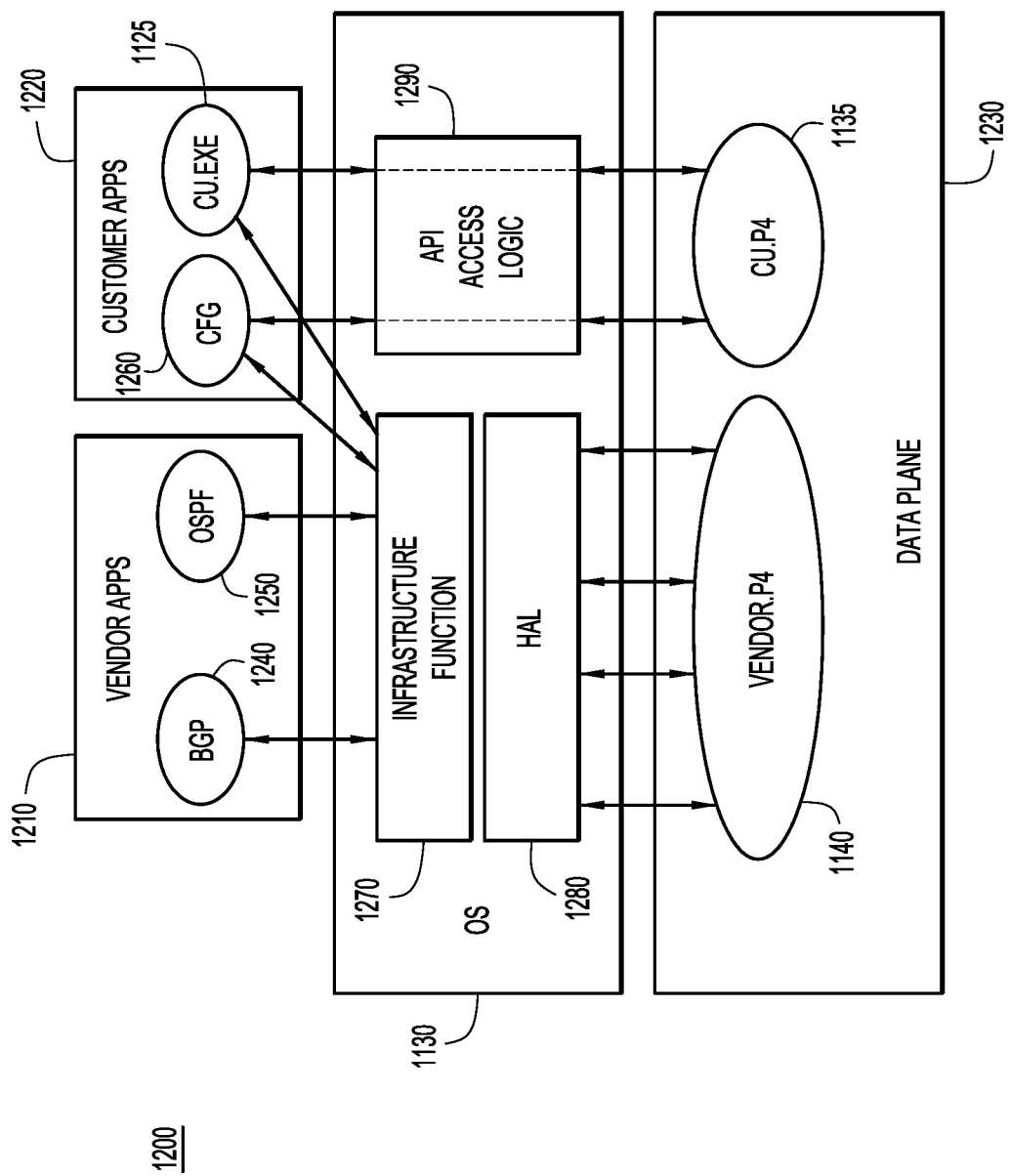
FIG. 12 illustrates a switching system software architecture diagram supporting incremental development of a data plane program, according to an example embodiment.

FIG. 12 illustrates an example software architecture 1200 for supporting incremental development of a data plane program. Software architecture 1200 includes vendor applications 1210, customer applications 1220, NetOS 1130, and data plane 1230. NetOS 1130 may comprise a (largely software-based) control plane. Vendor applications 1210 running on NetOS 1130 may include Border Gateway Protocol (BGP) 1240 and Open Shortest Path First (OSPF) 1250. Customer applications 1210 may include configuration application 1260 and Cu.exe 1125. NetOS 1130 may include infrastructure functions 1270, Hardware Abstraction Layer (HAL) 1280, and API access logic 1290. Data plane 1230 may include binary code generated from Vendor.p4 1140 and Cu.p4 1135.

Data plane 1230 may be hardware-based. Customer applications 1220 may be contained in a guest shell, container, virtual machine, etc. API access logic 1290 may be included in incremental development logic 190, and may provide controlled data plane API access to customer applications 1210. The APIs may be generated when, for example, compiling Vendor.p4 1140 and Cu.p4 1135 into Dataplane.bin 1155 (FIG. 11). API access logic 1290 may scan through all pre-existing tables and monitor when the customer tries to change one of those tables. The list of all pre-existing tables might be automatically generated from Vendor.p4 1140 and provided to API access logic 1290. If the customer tries to change the content of a pre-existing table, API access logic 1290 may block the change. If the table being manipulated is not a pre-existing table, API access logic 1290 may allow the change.

More specifically, software architecture 1200 enables NetOS 1130 to support the execution of Cu.exe 1125 and enables Cu.exe 1125 to access the driver of the programmable data plane chip in a controlled manner. In particular, API access logic 1290 permits Cu.exe 1125 to access only the sub-APIs corresponding to the Cu.p4 1135 (and not the sub-APIs corresponding to the Vendor.p4 1140). In one example, Vendor.p4 1140 may be stored in an encrypted form and decrypted only upon merging with Cu.p4 and compiling of the merged processing instructions. This prevents customers from accessing Vendor.p4 1140 and any proprietary information residing therein. NetOS 1130, due to the operation of API access logic 1290, may thereby prevent customer applications 1125 from accessing the sub-APIs of Vendor.p4 1140. Hence, API access logic 1290 may filter out any calls to the previously known sub-APIs of Vendor.p4 1140.

Figure 13:
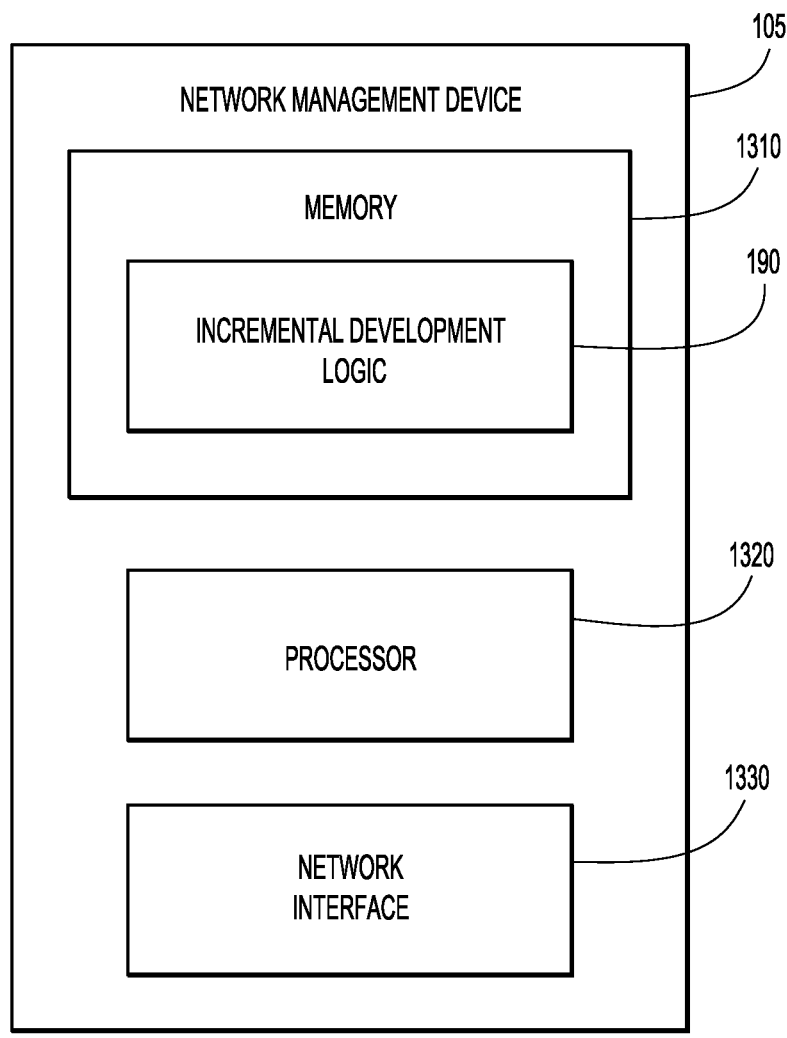
FIG. 13 illustrates a block diagram of a network node configured to perform incremental development of a data plane program, according to an example embodiment.

FIG. 13 is a simplified block diagram of network management device 105 configured to implement techniques presented herein. In this example, network management device 105 includes memory 1310 that stores instructions for incremental development logic 190, one or more processors 1320, and one or more network interfaces 1330. Memory 1310 may be read only memory (ROM), random access memory (RAM), magnetic disk storage media devices, optical storage media devices, flash memory devices, electrical, optical, or other physical/tangible memory storage devices. Thus, in general, memory 1310 may be one or more tangible (non-transitory) computer readable storage media (e.g., a memory device) encoded with software comprising computer executable instructions and when the software is executed (by processor 1320) it is operable to perform the operations described herein.

The one or more processors 1320 are configured to execute instructions stored in the memory 1310 for incremental development logic 190. When executed by the one or more processors 1320, incremental development logic 190 causes network management device 105 to perform operations described herein. It will be appreciated that at least a portion of incremental development logic 190 may be stored in one or more devices other than network management device 105, such as network node 120(1). Thus, in certain embodiments, network node 120(1) may perform at least some operations which are described herein as being performed by network management device 105. Furthermore, even in embodiments where incremental development logic 190 is stored entirely in network management device 105, network node 120(1) may store corresponding logic to support/interact with incremental development logic 190.

One or more network interfaces 1330 may include a network interface card (or multiple instances of such a device) or other network interface device that enables network communications on behalf of network management device 105.

FIG. 14 illustrates a flowchart of a method 1400 for incremental development of a data plane program. The method may be performed by a network management device (e.g., network management device 105). At 1410, the network management device obtains (e.g., receives) a definition of a first network packet header, an identification of a condition indicating that a network packet has the first network packet header, and a definition of processing action information that includes a key and a processing action to be taken on the network packet when metadata in the network packet matches the key.

At 1420, the network management device merges custom network packet processing instructions written in a data plane programming language with pre-existing network packet processing instructions written in the data plane programming language to produce merged network packet processing instructions written in the data plane programming language. The custom network packet processing instructions define the first network packet header, identify the condition, and define the processing action information. At 1440, the network management device provides the merged network packet processing instructions for execution by a network node.

It will be appreciated that processing action information is not limited to tables, and may take any suitable form. For example, some programmable data plane chips may utilize registers, which are arrays of bit-words that can be both read and modified by the data plane program according to a programmable set of processing actions. Register elements may be accessed by index (i.e., the position in the array), through a hash, or through some other user defined function. Registers may be useful in implementing stateful processing of network packets where the results of processing previous network packets are taken into account when processing a packet. $P4_{14}$, the first version of P4, supports the use of registers. Similar techniques may be applied to registers as tables and actions. For example, customers adding new functionalities to pre-existing code may define new registers and associated operations, but may be prohibited from modifying pre-existing registers.

$P4_{16}$, a more recent version of P4, utilizes an even broader concept of externs. Externs are generic functionalities that a given programmable data plane chip can support. In $P4_{16}$, a register is handled as an extern. From the point of view of the customer, an extern is equivalent to a library function of which the programmer knows the declaration, but not the code. Similarly, the customer knows the declaration of an extern and may consequently invoke the declaration. Like the specific cases of tables and registers, the customer may add new extern instances, but may not modify those used in the pre-existing data plane processing instructions.

In one example, techniques are provided to support incremental programming of a P4 programmable data plane chip (e.g., adding new code to pre-existing code without requiring access to the pre-existing code). The pre-existing P4 program may be automatically analyzed and relevant information (e.g., metadata) may be extracted in support of the customer to enable the customer to use the metadata without needing to inspect the pre-existing code. Parser hookup points may also be extracted.

New headers and new parsers may be specified. For each parser, a hookup point among those extracted may be selected. New tables and parameters may be defined, and new keys, actions, and corresponding action data may be associated with entries in the new tables. The extracted metadata may be displayed to enable the customer to define lookup keys for the newly defined tables and actions. The order in which the newly defined tables should be applied among themselves and with respect to the pre-existing tables may be specified.

The network management device may automatically verify that the new code does not conflict with the pre-existing code in order to ensure that the interface between the functionalities defined by the pre-existing code and the control plane remains unchanged. This enables the pre-existing control plane (e.g., a network operating system) to continue functioning as before and to continue controlling the features implemented by the pre-existing code. The newly developed control plane may be permitted to access only the interface to the newly programmed functionalities, and not the pre-existing functionalities that would otherwise compromise the proper operation of the pre-existing control plane, such as a network operating system.

Automatically merging the new code with the pre-existing code leverages information provided by the customer in a guided way (e.g., the hookup points for newly specified parsers), thereby auto-generating automated code as needed to "glue" the pre-existing code and new code. An existing control plane (such as a network operating system) may enable execution of new control plane functionalities that control the newly added data plane functionalities in such a way that the new control plane functionalities are permitted to interact with the interface of the newly programmed functionalities. That is, the network operating system may deny access to the interface of the pre-existing data plane functionalities. In one possible implementation the programmable data plane chip itself has the capability to deny access to the interface of the pre-existing data plane functionalities.

An example methodology is described herein to add functionalities to a pre-existing data plane implemented as a pre-existing program running on a programmable data plane chip. A data plane incremental programming environment based on the disclosed methodology may enable a vendor to offer a network node (e.g., switch) with a programmable data plane as a turn-key system with full-fledged data plane functionality and a network operating system controlling data plane functionalities. The techniques presented herein enable a customer to write additional code without inspecting the code of the pre-existing program, which is important because such code might be proprietary and also because inspecting the code could be complex and time consuming. The techniques presented herein may also be applied to a hybrid data plane chip that includes a programmable or extensible parser, a non-programmable section or slice, and a programmable section or slice, where a data plane programming language (e.g., P4) description of the non-programmable section/slice is available (and is equivalent to the pre-existing data plane program previously mentioned) and a new data plane program is provided to be executed by the programmable slice. In one possible network node architecture, the hybrid data plane chip may be substituted by a chipset including two or more of a programmable or extensible parser, an Application Specific Integrated Circuit (ASIC), and a programmable data plane chip.

These techniques may also prevent the customer from affecting the functionalities implemented by the pre-existing code. In particular, a network management device and/or a GUI may lead a customer through the development of the new code. The network management device and/or the GUI may automatically verify that the new code is not going to compromise the proper operation of the pre-existing code and corresponding data plane functionalities. The network node may utilize the network OS to control such functionalities. Furthermore, the network management device may automatically merge the pre-existing program with the newly written code.

In one form, a method is provided. The method comprises: obtaining a definition of a first network packet header, an identification of a condition indicating that a network packet has the first network packet header, and a definition of processing action information that includes a key and a processing action to be taken on the network packet when metadata in the network packet matches the key; merging custom network packet processing instructions written in a data plane programming language with pre-existing network packet processing instructions written in the data plane programming language to produce merged network packet processing instructions written in the data plane programming language, wherein the custom network packet processing instructions define the first network packet header, identify the condition, and define the processing action information; and providing the merged network packet processing instructions to a network node.

In one example, the network node is configured to execute the merged network packet processing instructions by: obtaining the network packet; determining that the condition is present in the network packet; in response to determining that the condition is present, parsing the first network packet header for the metadata; determining that the metadata matches the key; and executing the processing action on the network packet in response to determining that the metadata matches the key.

In another example, the method further comprises: determining that the processing action information is not a modification of pre-existing processing action information defined in the pre-existing network packet processing instructions; and in response to determining that the processing action information is not a modification of the pre-existing processing action information, automatically generating automated network packet processing instructions to facilitate merging of the custom network packet processing instructions with the pre-existing network packet processing instructions.

In yet another example, the condition is the network packet having a second network packet header of a specified type or the network packet having a specific value or a range of values.

In yet another example, the method further comprises: automatically extracting one or more conditions including the condition indicating that the network packet has the first network packet header; and presenting an indication of the one or more conditions.

In yet another example, the pre-existing network packet processing instructions includes a series of pre-existing processing actions, and merging the custom network packet processing instructions with the pre-existing network packet processing instructions includes inserting the processing action before or after the series of processing actions.

In yet another example, the key is one of a plurality of pre-defined keys in the pre-existing network packet processing instructions, and the method further comprises: providing an indication of the plurality of pre-defined keys.

In yet another example, the method further comprises: providing a first display screen to receive user input of the definition of the first network packet header; after obtaining the definition of the first network packet header, providing a second display screen to receive user input of the identification of the condition; and after obtaining the identification of the condition, providing a third display screen to receive user input of the definition of the processing action information.

In another form, an apparatus is provided. The apparatus comprises: a network interface configured to send and/or receive network packets; and one or more processors couple to the network interface, wherein the one or more processors are configured to: obtain a definition of a first network packet header, an identification of a condition indicating that a network packet has the first network packet header, and a definition of processing action information that includes a key and a processing action to be taken on the network packet when metadata in the network packet matches the key; merge custom network packet processing instructions written in a data plane programming language with pre-existing network packet processing instructions written in the data plane programming language to produce merged network packet processing instructions written in the data plane programming language, wherein the custom network packet processing instructions define the first network packet header, identify the condition, and define the processing action information; and provide the merged network packet processing instructions to a network node.

In another form, one or more non-transitory computer readable storage media are provided. The non-transitory computer readable storage media are encoded with instructions that, when executed by a processor, cause the processor to: obtain a definition of a first network packet header, an identification of a condition indicating that a network packet has the first network packet header, and a definition of processing action information that includes a key and a processing action to be taken on the network packet when metadata in the network packet matches the key; merge custom network packet processing instructions written in a data plane programming language with pre-existing network packet processing instructions written in the data plane programming language to produce merged network packet processing instructions written in the data plane programming language, wherein the custom network packet processing instructions define the first network packet header, identify the condition, and define the processing action information; and provide the merged network packet processing instructions to a network node.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   providing an indication of a plurality of pre-defined keys in pre-existing network packet processing instructions written in a data plane programming language;
   obtaining a definition of a first network packet header, an identification of a condition indicating that a network packet has the first network packet header, and a definition of processing action information that includes a key of the plurality of pre-defined keys and a processing action to be taken on the network packet when metadata in the network packet matches the key;
   merging custom network packet processing instructions written in the data plane programming language with the pre-existing network packet processing instructions to produce merged network packet processing instructions written in the data plane programming language, wherein the custom network packet processing instructions define the first network packet header, identify the condition, and define the processing action information; and
   providing the merged network packet processing instructions for execution by a network node.

2. The method of claim 1, wherein the network node is configured to execute the merged network packet processing instructions by:
   obtaining the network packet;
   determining that the condition is present in the network packet;
   in response to determining that the condition is present, parsing the first network packet header for the metadata;
   determining that the metadata matches the key; and
   executing the processing action on the network packet in response to determining that the metadata matches the key.

3. The method of claim 1, further comprising:
   determining that the processing action information is not a modification of pre-existing processing action information defined in the pre-existing network packet processing instructions; and
   in response to determining that the processing action information is not a modification of the pre-existing processing action information, automatically generating automated network packet processing instructions to facilitate merging of the custom network packet processing instructions with the pre-existing network packet processing instructions.

4. The method of claim 1, wherein the condition is the network packet having a second network packet header of a specified type or the network packet having a specific value or a range of values.

5. The method of claim 1, further comprising:
   automatically extracting one or more conditions including the condition indicating that the network packet has the first network packet header; and
   presenting an indication of the one or more conditions.

6. The method of claim 1, wherein the pre-existing network packet processing instructions includes a series of pre-existing processing actions, and wherein merging the custom network packet processing instructions with the pre-existing network packet processing instructions includes inserting the processing action before or after the series of pre-existing processing actions.

7. The method of claim 1, further comprising:
   providing a first display screen to receive user input of the definition of the first network packet header;
   after obtaining the definition of the first network packet header, providing a second display screen to receive user input of the identification of the condition; and
   after obtaining the identification of the condition, providing a third display screen to receive user input of the definition of the processing action information.

8. The method of claim 1, wherein the custom network packet processing instructions are written by a customer and the pre-existing network packet processing instructions are written by a vendor.

9. An apparatus comprising:
   a network interface configured to send and/or receive network packets; and
   one or more processors coupled to the network interface, wherein the one or more processors are configured to:
      provide an indication of a plurality of pre-defined keys in pre-existing network packet processing instructions written in a data plane programming language;
      obtain a definition of a first network packet header, an identification of a condition indicating that a network packet has the first network packet header, and a definition of processing action information that includes a key of the plurality of pre-defined keys and a processing action to be taken on the network packet when metadata in the network packet matches the key;
      merge custom network packet processing instructions written in the data plane programming language with the pre-existing network packet processing instructions to produce merged network packet processing instructions written in the data plane programming language, wherein the custom network packet processing instructions define the first network packet header, identify the condition, and define the processing action information; and
      provide the merged network packet processing instructions to a network node.

10. The apparatus of claim 9, wherein the network node is configured to execute the merged network packet processing instructions by:
    obtaining the network packet;
    determining that the condition is present in the network packet;
    in response to determining that the condition is present, parsing the first network packet header for the metadata;
    determining that the metadata matches the key; and
    executing the processing action on the network packet in response to determining that the metadata matches the key.

11. The apparatus of claim 9, wherein the one or more processors are further configured to:

determine that the processing action information is not a modification of pre-existing processing action information defined in the pre-existing network packet processing instructions; and in response to determining that the processing action information is not a modification of the pre-existing processing action information, automatically generate automated network packet processing instructions to facilitate merging of the custom network packet processing instructions with the pre-existing network packet processing instructions.

12. The apparatus of claim 9, wherein the condition is the network packet having a second network packet header of a specified type or the network packet having a specific value or a range of values.

13. The apparatus of claim 9, wherein the one or more processors are further configured to:

automatically extract one or more conditions including the condition indicating that the network packet has the first network packet header; and present an indication of the one or more conditions.

14. The apparatus of claim 9, wherein the pre-existing network packet processing instructions includes a series of pre-existing processing actions, and wherein the one or more processors are configured to merge the custom network packet processing instructions with the pre-existing network packet processing instructions by inserting the processing action before or after the series of pre-existing processing actions.

15. The apparatus of claim 9, wherein the one or more processors are further configured to:

provide a first display screen to receive user input of the definition of the first network packet header;

after obtaining the definition of the first network packet header, provide a second display screen to receive user input of the identification of the condition; and after obtaining the identification of the condition, provide a third display screen to receive user input of the definition of the processing action information.

16. The apparatus of claim 9, wherein the custom network packet processing instructions are written by a customer and the pre-existing network packet processing instructions are written by a vendor.

17. One or more non-transitory computer readable storage media encoded with instructions that, when executed by a processor, cause the processor to:

provide an indication of a plurality of pre-defined keys in pre-existing network packet processing instructions written in a data plane programming language;

obtain a definition of a first network packet header, an identification of a condition indicating that a network packet has the first network packet header, and a definition of processing action information that includes a key of the plurality of pre-defined keys and a processing action to be taken on the network packet when metadata in the network packet matches the key;

merge custom network packet processing instructions written in the data plane programming language with the pre-existing network packet processing instructions to produce merged network packet processing instructions written in the data plane programming language, wherein the custom network packet processing instructions define the first network packet header, identify the condition, and define the processing action information; and provide the merged network packet processing instructions to a network node.

18. The one or more non-transitory computer readable storage media of claim 17, wherein the network node is configured to execute the merged network packet processing instructions by:

obtaining the network packet;

determining that the condition is present in the network packet;

in response to determining that the condition is present, parsing the first network packet header for the metadata;

determining that the metadata matches the key; and executing the processing action on the network packet in response to determining that the metadata matches the key.

19. The one or more non-transitory computer readable storage media of claim 17, wherein the instructions further cause the processor to:

determine that the processing action information is not a modification of pre-existing processing action information defined in the pre-existing network packet processing instructions; and in response to determining that the processing action information is not a modification of the pre-existing processing action information, automatically generate automated network packet processing instructions to facilitate merging of the custom network packet processing instructions with the pre-existing network packet processing instructions.

20. The one or more non-transitory computer readable storage media of claim 17, wherein the condition is the network packet having a second network packet header of a specified type or the network packet having a specific value or a range of values.

* * * * *